(12) United States Patent
Chen et al.

(10) Patent No.: US 11,929,060 B2
(45) Date of Patent: Mar. 12, 2024

(54) CONSISTENCY PREDICTION ON STREAMING SEQUENCE MODELS

(71) Applicant: Google LLC, Mountain View, CA (US)

(72) Inventors: Zhehuai Chen, Jersey City, NJ (US); Andrew Rosenberg, Brooklyn, NY (US); Bhuvana Ramabhadran, Mt. Kisco, NY (US); Pedro Jose Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 90 days.

(21) Appl. No.: 17/170,836

(22) Filed: Feb. 8, 2021

(65) Prior Publication Data
US 2021/0280170 A1    Sep. 9, 2021

Related U.S. Application Data

(60) Provisional application No. 62/985,278, filed on Mar. 4, 2020.

(51) Int. Cl.
*G10L 15/06* (2013.01)
*G06N 3/04* (2023.01)
(Continued)

(52) U.S. Cl.
CPC .......... *G10L 15/063* (2013.01); *G06N 3/044* (2023.01); *G06N 3/045* (2023.01); *G06N 3/088* (2013.01);
(Continued)

(58) Field of Classification Search
CPC ....... G10L 15/063; G10L 13/02; G10L 15/16; G10L 15/197; G10L 2015/0635; G06N 3/0445; G06N 3/0454; G06N 3/088
See application file for complete search history.

(56) References Cited

U.S. PATENT DOCUMENTS 8,751,239 B2 * 6/2014 Tian .................... G10L 21/00
704/266
10,402,977 B1   9/2019 Kim et al.
(Continued)

FOREIGN PATENT DOCUMENTS

JP        2022552950 A    12/2022

OTHER PUBLICATIONS

Li et al., "Training Neural Speech Recognition Systems with Synthetic Speech Augmentation" arXiv preprint arXiv:1811.00707 (2018). (Year: 2018).*

(Continued)

*Primary Examiner* — Douglas Godbold
*Assistant Examiner* — Edward Tracy, Jr.
(74) *Attorney, Agent, or Firm* — Honigman LLP; Brett A. Krueger; Grant J. Griffith

(57) ABSTRACT

A method for training a speech recognition model includes receiving a set of training utterance pairs each including a non-synthetic speech representation and a synthetic speech representation of a same corresponding utterance. At each of a plurality of output steps for each training utterance pair in the set of training utterance pairs, the method also includes determining a consistent loss term for the corresponding training utterance pair based on a first probability distribution over possible non-synthetic speech recognition hypotheses generated for the corresponding non-synthetic speech representation and a second probability distribution over possible synthetic speech recognition hypotheses generated for the corresponding synthetic speech representation. The first and second probability distributions are generated for output by the speech recognition model. The method also includes updating parameters of the speech recognition model based on the consistent loss term determined at each (Continued)

of the plurality of output steps for each training utterance pair.

26 Claims, 8 Drawing Sheets

(51) Int. Cl.
  *G06N 3/044* (2023.01)
  *G06N 3/045* (2023.01)
  *G06N 3/08* (2023.01)
  *G06N 3/088* (2023.01)
  *G10L 13/02* (2013.01)
  *G10L 15/16* (2006.01)
  *G10L 15/197* (2013.01)

(52) U.S. Cl.
  CPC .............. *G10L 13/02* (2013.01); *G10L 15/16* (2013.01); *G10L 15/197* (2013.01); *G10L 2015/0635* (2013.01)

(56) References Cited

U.S. PATENT DOCUMENTS

| | | | |
|---|---|---|---|
| 10,410,120 | B1 | 9/2019 | Kim et al. |
| 10,628,688 | B1* | 4/2020 | Kim ..................... G05D 1/0088 |
| 2019/0180732 | A1 | 6/2019 | Ping et al. |
| 2019/0287515 | A1 | 9/2019 | Li et al. |
| 2019/0304480 | A1 | 10/2019 | Narayanan et al. |
| 2020/0349927 | A1* | 11/2020 | Stoimenov .............. G10L 15/16 |
| 2021/0224606 | A1* | 7/2021 | Lee ..................... G06N 3/0472 |
| 2022/0051059 | A1* | 2/2022 | Shang ................ G06V 10/7753 |

OTHER PUBLICATIONS

Chiu, Chung-Cheng, et al. "State-of-the-art speech recognition with sequence-to-sequence models." 2018 IEEE international conference on acoustics, speech and signal processing (ICASSP). IEEE, 2018. (Year: 2018).*

Prabhavalkar, Rohit, et al. "A Comparison of sequence-to-sequence models for speech recognition." Interspeech. 2017. (Year: 2017).*

Gokay, Ramazan, and Hulya Yalcin. "Improving low resource Turkish speech recognition with data augmentation and TTS." 2019 16th International Multi-Conference on Systems, Signals & Devices (SSD). IEEE, 2019. (Year: 2019).*

Graves, Alex, et al. "Connectionist temporal classification: labelling unsegmented sequence data with recurrent neural networks." Proceedings of the 23rd international conference on Machine learning. 2006. (Year: 2006).*

International Search Report, PCT/US2021/017147, dated May 12, 2021, 15 pages.

Sahoko et al., "Speech Chain for Semi-Supervised Learning of Japanese-English Code-Switching ASR and TTS," Dec. 18, 2018, 8 pages.

Rosenberg et al., "Speech Recognition with Augmented Synthesized Speech," Dec. 14, 2019, 7 pages.

Wang et al., "Improving Speech Recognition Using Consistent Predictions on Synthesized Speech," May 4, 2020, 5 pages.

Chen et al., "Improving Speech Recognition Using GAN-Based Speech Synthesis and Contrastive Unspoken Test Selection," Oct. 19, 2020, 5 pages.

Indian Examination Report for the related Indian Application No. 202227046777, dated Nov. 18, 2022, 5 pages.

Indian Office Action for the related Indian Application No. 202227046777, dated Nov. 22, 2022, 8 pages.

Notice of Reason for Rejection for the related Japanese Application No. 2022-552950, dated Apr. 3, 2023, 6 pages.

Chiu, Chung-Cheng et al., "State-Of-The-Art Speech Recognition With Sequence-to-Sequence Models", [online], Feb. 23, 2018, [retrieved on Mar. 24, 2023], Retrieved from the Internet: <URL:https://arxiv.org.pdf/1712.01769.pdf>, arXiv:1712.01769v6 [cs.CL], 5 pages.

Sei Ueno et al., "Data Extension of Word-by-Word End-to-End Speech Recognition Using End-to-End Speech Synthesis," IPSJ Research Report, Dec. 3, 2018, vol. 2018-SLP-125, No. 2, pp. 1-5, 5 pages.

Sahoko Nakayama et al., "Recognition of Japanese-English code-switching speech using semi-supervised learning based on Machine Speech Chain.", Mar. 4, 2019, pp. 179-182, 5 pages.

* cited by examiner

CONSISTENCY PREDICTION ON STREAMING SEQUENCE MODELS

CROSS REFERENCE TO RELATED APPLICATIONS

This U.S. application claims priority under 35 U.S.C. § 119(e) to U.S. Provisional Application 62/985,278, filed on Mar. 4, 2020. The disclosure of this prior application is considered part of the disclosure of this application and is hereby incorporated by reference in its entirety.

TECHNICAL FIELD

This disclosure relates to consistency prediction on streaming sequence models.

BACKGROUND

Automatic speech recognition (ASR), the process of taking an audio input and transcribing it into text, has greatly been an important technology that is used in mobile devices and other devices. In general, automatic speech recognition attempts to provide accurate transcriptions of what a person has said by taking an audio input (e.g., speech utterance) and transcribing the audio input into text. Modern ASR models continue to improve in both accuracy (e.g. a low word error rate (WER)) and latency (e.g., delay between the user speaking and the transcription) based on the ongoing development of deep neural networks. However, one challenge in developing deep learning-based ASR models is that parameters of the ASR models tend to over fit the training data, thereby resulting in the ASR models having difficulties generalizing unseen data when the training data is not extensive enough. As a result, training ASR models on larger training datasets improves the accuracy of the ASR model. Synthesized speech and/or data-augmented speech can be incorporated to increase the volume of training data used to train the ASR models

SUMMARY

One aspect of the disclosure provides a computer-implemented method that when executed on data processing hardware causes the data processing hardware to perform operations. The operations include receiving a set of training utterance pairs that each include a non-synthetic speech representation of a corresponding utterance and a synthetic speech representation of the corresponding utterance. At each of a plurality of output steps for each training utterance pair in the set of training utterance pairs, the operations also include: generating, for output by a speech recognition model, a first probability distribution over possible non-synthetic speech recognition hypotheses for the corresponding non-synthetic speech representations of the corresponding utterance; generating, for output by the speech recognition model, a second probability distribution over possible synthetic speech recognition hypotheses for the corresponding synthetic speech representation of the corresponding utterance; and determining a consistent loss term for the corresponding training utterance pair based on the first probability distribution over possible non-synthetic speech recognition hypotheses and the second probability distribution over possible non-synthetic speech recognition hypotheses. The operations also include updating parameters of the speech recognition model based on the consistent loss term determined at each of the plurality of output steps for each training utterance pair in the set of training utterance pairs.

Implementations of the disclosure may include one or more of the following optional features. In some implementations, the operations further include, at each of the plurality of output steps for each training utterance pair in the set of training utterance pairs, generating a non-synthetic speech loss term based on the first probability distribution over possible non-synthetic speech recognition hypotheses for the corresponding non-synthetic speech representation of the corresponding utterance and generating a synthetic speech loss term based on the second probability distribution over possible synthetic speech recognition hypotheses for the corresponding synthetic speech representation of the corresponding utterance and the ground-truth transaction of the corresponding utterance. In some examples, the parameters of the speech recognition model are updated based on the consistent loss term determined at each of the plurality of output steps for each training utterance pair in the set of training utterance pairs independently of the non-synthetic and synthetic speech loss terms generated at each of the plurality of output steps for each training utterance pair in the set of training utterance pairs.

Optionally, the synthetic speech representation in each training utterance pair may include synthesized speech that represents the corresponding utterance. In some implementations, for each training utterance pair, the operations further include converting, using a text-to-speech (TTS) model, a ground truth transcription of the corresponding utterance to generate the corresponding synthetic speech representation. For at least one training utterance pair, the operations may further include applying data augmentation to at least of the corresponding non-synthetic speech representation or the corresponding synthetic speech representation. Here, the applied data augmentation may include at least one of adding noise, adding reverberation, or manipulating timing.

In some examples, determining the consistent loss term for the corresponding training utterance pair is based on a Kullback-Leibler divergence between the first probability distribution over possible non-synthetic speech recognition hypotheses and the second probability distribution over possible non-synthetic speech recognition hypotheses. In these examples, prior to determining the consistent loss term or the corresponding training utterance pair and when the speech recognition model includes a frame alignment-based transducer model, the operations may further include defining a valid alignment distribution for a sequence of first probability distributions over possible non-synthetic speech recognition hypotheses generated at each of the output steps and a sequence of second probability distribution over possible synthetic speech recognition hypotheses generated at each of the output steps based on a probability of valid alignments of a ground-truth transcription of the corresponding utterance. Here the valid alignment distribution is defined over each output label in a sequence of output label that represent the ground-truth transcription of the corresponding utterance.

In some implementations, the speech recognition model includes a frame-alignment-based transducer model. In these implementations, the frame-alignment-based transducer model includes a Recurrent Neural Network-Transducer (RNN-T) model. Optionally, the speech recognition model may include an alignment-based encoder-decoder model.

Another aspect of the disclosure provides a system that includes data processing hardware and memory hardware in communication with the data processing hardware and storing instructions that when executed on the data processing hardware cause the data processing hardware to perform operations. The operations include receiving a set of training utterance pairs that each include a non-synthetic speech representation of a corresponding utterance and a synthetic speech representation of the corresponding utterance. At each of a plurality of output steps for each training utterance pair in the set of training utterance pairs, the operations also include: generating, for output by a speech recognition model, a first probability distribution over possible non-synthetic speech recognition hypotheses for the corresponding non-synthetic speech representations of the corresponding utterance; generating, for output by the speech recognition model, a second probability distribution over possible synthetic speech recognition hypotheses for the corresponding synthetic speech representation of the corresponding utterance; and determining a consistent loss term for the corresponding training utterance pair based on the first probability distribution over possible non-synthetic speech recognition hypotheses and the second probability distribution over possible non-synthetic speech recognition hypotheses. The operations also include updating parameters of the speech recognition model based on the consistent loss term determined at each of the plurality of output steps for each training utterance pair in the set of training utterance pairs.

Implementations of the disclosure may include one or more of the following optional features. In some implementations, the operations father include, at each of the plurality of output steps for each training utterance pair in the set of training utterance pairs, generating a non-synthetic speech loss term based on the first probability distribution over possible non-synthetic speech recognition hypotheses for the corresponding non-synthetic speech representation of the corresponding utterance and generating a synthetic speech loss term based on the second probability distribution over possible synthetic speech recognition hypotheses for the corresponding synthetic speech representation of the corresponding utterance and the ground-truth transaction of the corresponding utterance. In some examples, the parameters of the speech recognition model are updated based on the consistent loss term determined at each of the plurality of output steps for each training utterance pair in the set of training utterance pairs independently of the non-synthetic and synthetic speech loss terms generated at each of the plurality of output steps for each training utterance pair in the set of training utterance pairs.

Optionally, the synthetic speech representation in each training utterance pair may include synthesized speech that represents the corresponding utterance. In some implementations, for each training utterance pair, the operations further include converting, using a text-to-speech (TTS) model, a ground truth transcription of the corresponding utterance to generate the corresponding synthetic speech representation. For at least one training utterance pair, the operations may further include applying data augmentation to at least of the corresponding non-synthetic speech representation or the corresponding synthetic speech representation. Here, the applied data augmentation may include at least one of adding noise, adding reverberation, or manipulating timing.

In some examples, determining the consistent loss term for the corresponding training utterance pair is based on a Kullback-Leibler divergence between the first probability distribution over possible non-synthetic speech recognition hypotheses and the second probability distribution over possible non-synthetic speech recognition hypotheses. In these examples, prior to determining the consistent loss term or the corresponding training utterance pair and when the speech recognition model includes a frame alignment-based transducer model, the operations may further include defining a valid alignment distribution for a sequence of first probability distributions over possible non-synthetic speech recognition hypotheses generated at each of the output steps and a sequence of second probability distribution over possible synthetic speech recognition hypotheses generated at each of the output steps based on a probability of valid alignments of a ground-truth transcription of the corresponding utterance. Here the valid alignment distribution is defined over each output label in a sequence of output label that represent the ground-truth transcription of the corresponding utterance.

In some implementations, the speech recognition model includes a frame-alignment-based transducer model. In these implementations, the frame-alignment-based transducer model includes a Recurrent Neural Network-Transducer (RNN-T) model. Optionally, the speech recognition model may include an alignment-based encoder-decoder model.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Automated speech recognition has made tremendous strides with the introduction of sequence to sequence (Seq2Seq) models that map from audio to character sequences. At the same time, text-to-speech (TTS) or speech syntheses systems have successfully applied Seq2Seq models to obtain state of the art natural, realistic sounding synthesized speech that can be indistinguishable to the human ear from human speech.

One challenge in developing deep learning-based ASR models is that parameters of the ASR models tend to over fit the training data, thereby resulting in the ASR models having difficulties generalizing unseen data when the training data is not extensive enough. As a result, training ASR models on larger training datasets improves the accuracy of the ASR model. Implementations herein are directed toward using synthesized speech for training ASR models to maintain accuracy of the ASR model with less available human speech training data and also improve performance of the ASR model when large amounts of training data are available. Here, synthesized speech has the potential to drastically limit the amount of labeled human speech required to train the model, while also providing flexibility in moving the ASR model across different domains.

Generally, the use of synthesized speech has shown to impact ASR training differently than human speech, despite instances of state of the art synthesized speech being indistinguishable from human speech. This gap between synthesized speech and human speech is attributed to mismatches in the synthesized speech data from the human speech data that arise from the difficult one-to-many mapping problem that TTS systems are trying to solve. Namely, while the aggregate quality of available synthesized speech is very high, the synthesized speech exhibits much less variation than human speech, as well as minimal speech disfluencies. As a result, training ASR models exclusively on synthesized speech data presents a difficulty for generalizing real speech utterances during inference.

Implementations herein are directed toward training an ASR model on real/human speech and synthesized speech representations of a same training utterance and introducing a consistent loss term to promote consistent predictions (e.g., speech recognition hypothesis) on both the real/human and synthesized representations of the same training utterance. In short, the consistent loss term between human and synthesized representations of a same utterance provides an unsupervised training aspect by encouraging the ASR model to behave consistently on training utterances of human speech and synthesized speech. Additional implementations include applying data augmentation techniques such as synthesizing diverse realizations of training utterances by varying synthesized speaker characteristics in order to promote robustness to speaker differences.

Figure 1:
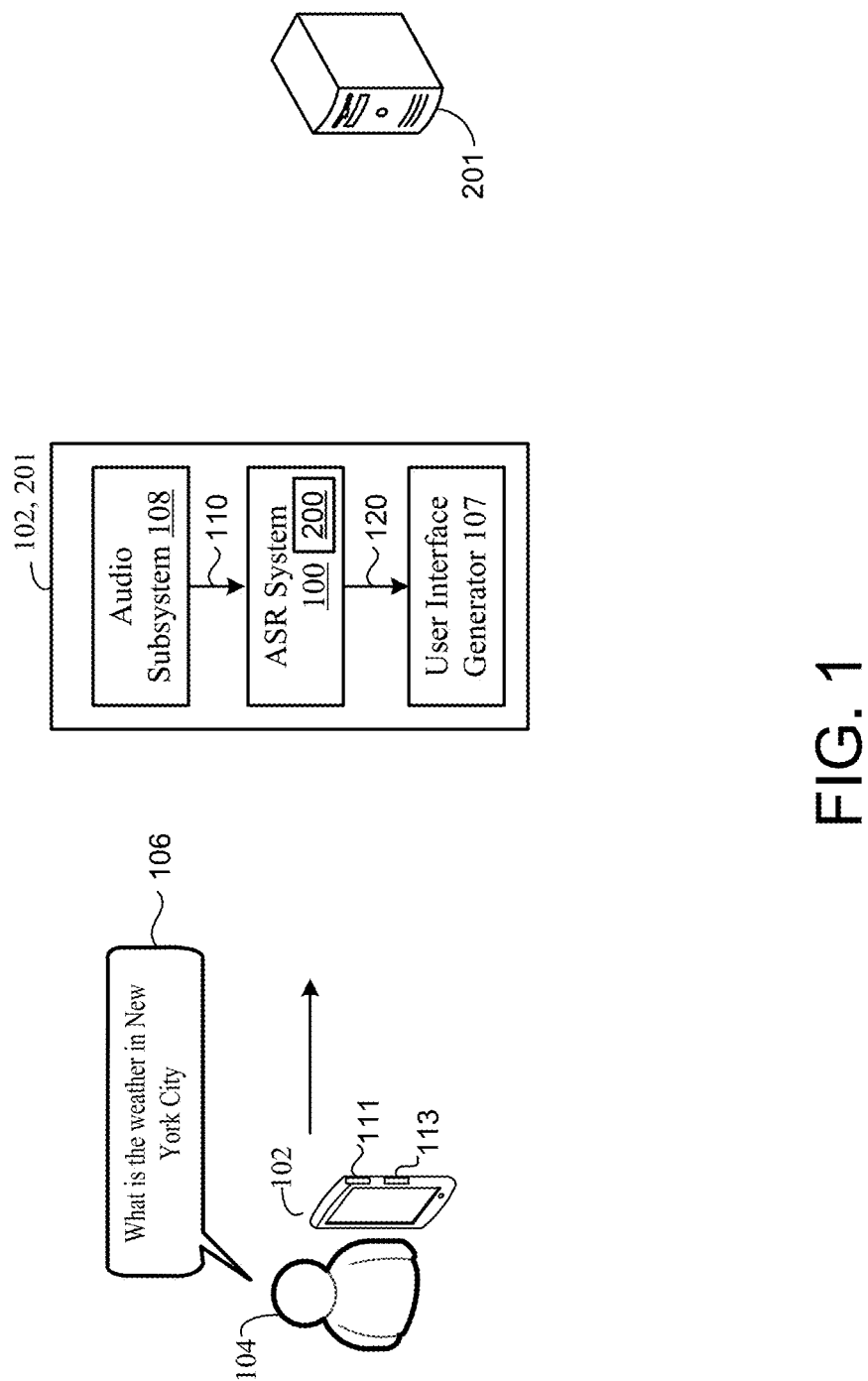
FIG. 1 is a schematic view of an example speech recognition system.

FIG. 1 illustrates an automated speech recognition (ASR) system 100 implementing an ASR model 200 that resides on a user device 102 of a user 104 and/or on a remote computing device 201 (e.g., one or more servers of a distributed system executing in a cloud-computing environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device, and is equipped with data processing hardware 111 and memory hardware 113.

The user device 102 includes an audio subsystem 108 configured to receive an utterance 106 spoken by the user 104 (e.g., the user device 102 may include one or more microphones for recording the spoken utterance 106) and convert the utterance 106 into a corresponding digital format associated with input acoustic frames 110 capable of being processed by the ASR system 100. In the example shown, the user speaks a respective utterance 106 in a natural language of English for the phrase "What is the weather in New York City?" and the audio subsystem 108 converts the utterance 106 into corresponding acoustic frames 110 for input to the ASR system 100. Thereafter, the ASR model 200 receives, as input, the acoustic frames 110 corresponding to the utterance 106, and generates/predicts, as output, a corresponding transcription 120 (e.g., recognition result/hypothesis) of the utterance 106. In the example shown, the user device 102 and/or the remote computing device 201 also executes a user interface generator 107 configured to present a representation of the transcription 120 of the utterance 106 to the user 104 of the user device 102. In some configurations, the transcription 120 output from the ASR system 100 is processed, e.g., by a natural language understanding (NLU) module executing on the user device 102 or the remote computing device 201, to execute a user command. Additionally or alternatively, a text-to-speech system (e.g., executing on any combination of the user device 102 or the remote computing device 201) may convert the transcription into synthesized speech for audible output by another device. For instance, the original utterance 106 may correspond to a message the user 104 is sending to a friend in which the transcription 120 is converted to synthesized speech for audible output to the friend to listen to the message conveyed in the original utterance 106.

Figure 2A:
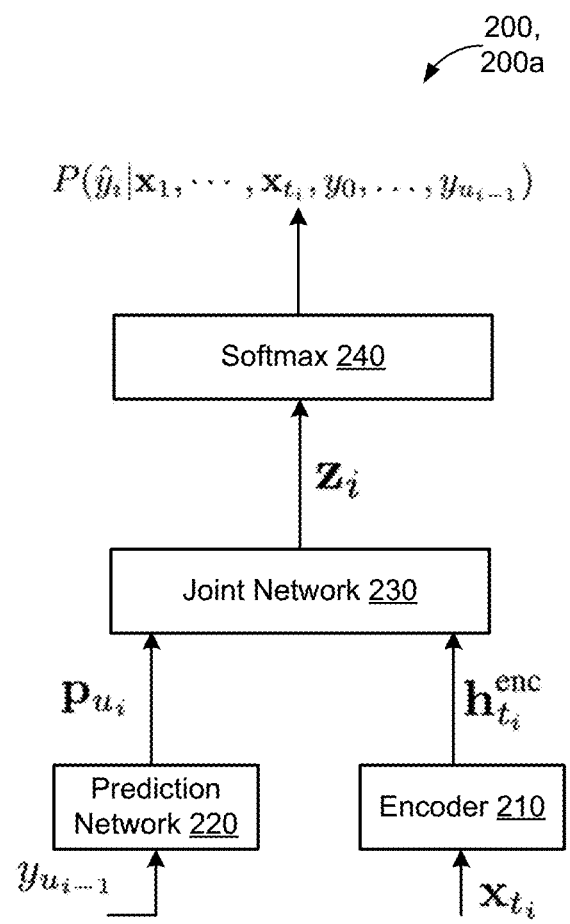
FIG. 2A is a schematic view of a Recurrent Neural Network-Transducer (RNN-T) model architecture.
Figure 2B:
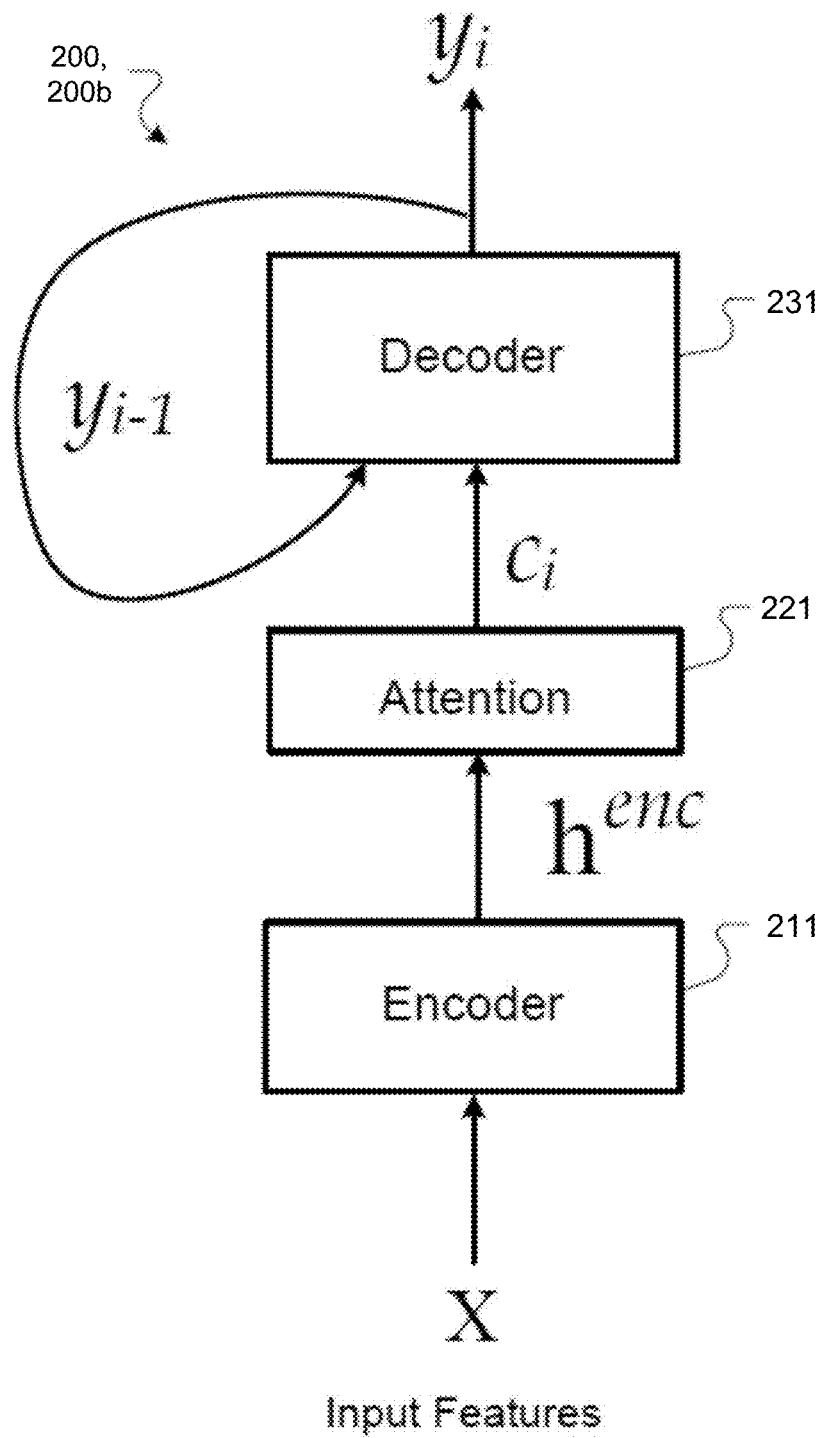
FIG. 2B is a schematic view of an Attention-Based Encoder-Decoder (AED) model architecture.

With reference to FIGS. 2A and 2B, the ASR model 200 may include an end-to-end (E2E) sequence-to-sequence model, such as a frame alignment-based transducer model 200a (FIG. 2A) or an attention-based encoder-decoder (AED) model 200b (FIG. 2B). The ASR model 200 may provide E2E speech recognition by integrating acoustic, pronunciation, and language models into a single neural network, and does not require a lexicon or a separate text normalization component. Various structures and optimization mechanisms can provide increased accuracy and reduced model training time.

Referring to FIG. 2A, an example frame alignment-based transducer model 200a includes a Recurrent Neural Network-Transducer (RNN-T) model architecture which adheres to latency constrains associated with interactive applications. The RNN-T model 200a provides a small computational footprint and utilizes less memory requirements than conventional ASR architectures, making the RNN-T model architecture suitable for performing speech recognition entirely on the user device 102 (e.g., no communication with a remote server is required). The RNN-T model 200a includes an encoder network 210, a prediction network 220, and a joint network 230. The encoder network 210, which is roughly analogous to an acoustic model (AM) in a traditional ASR system, includes a recurrent network of stacked Long Short-Term Memory (LSTM) layers. For instance, the encoder reads a sequence of d-dimensional feature vectors (e.g., acoustic frames 110 (FIG. 1)) $x=(x_1, x_2, \ldots, x_T)$, where $x_t \in \mathbb{R}^d$, and produces at each time step a higher-order feature representation. This higher-order feature representation is denoted as $h_1^{enc}, \ldots, h_T^{enc}$.

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $p_{u_i}$. Finally, with the RNN-T model architecture, the representations produced by the encoder and prediction networks 210, 220 are combined by the joint network 230. The joint network then predicts $P(y_i|x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200a at the corresponding output step. In this manner, the RNN-T model 200a does not make a conditional independence assumption, rather the prediction of each symbol is conditioned not only on the acoustics but also on the sequence of labels output so far. The RNN-T model 200a does assume an output symbol is independent of future acoustic frames 110, which allows the RNN-T model to be employed in a streaming fashion.

Figure 3:
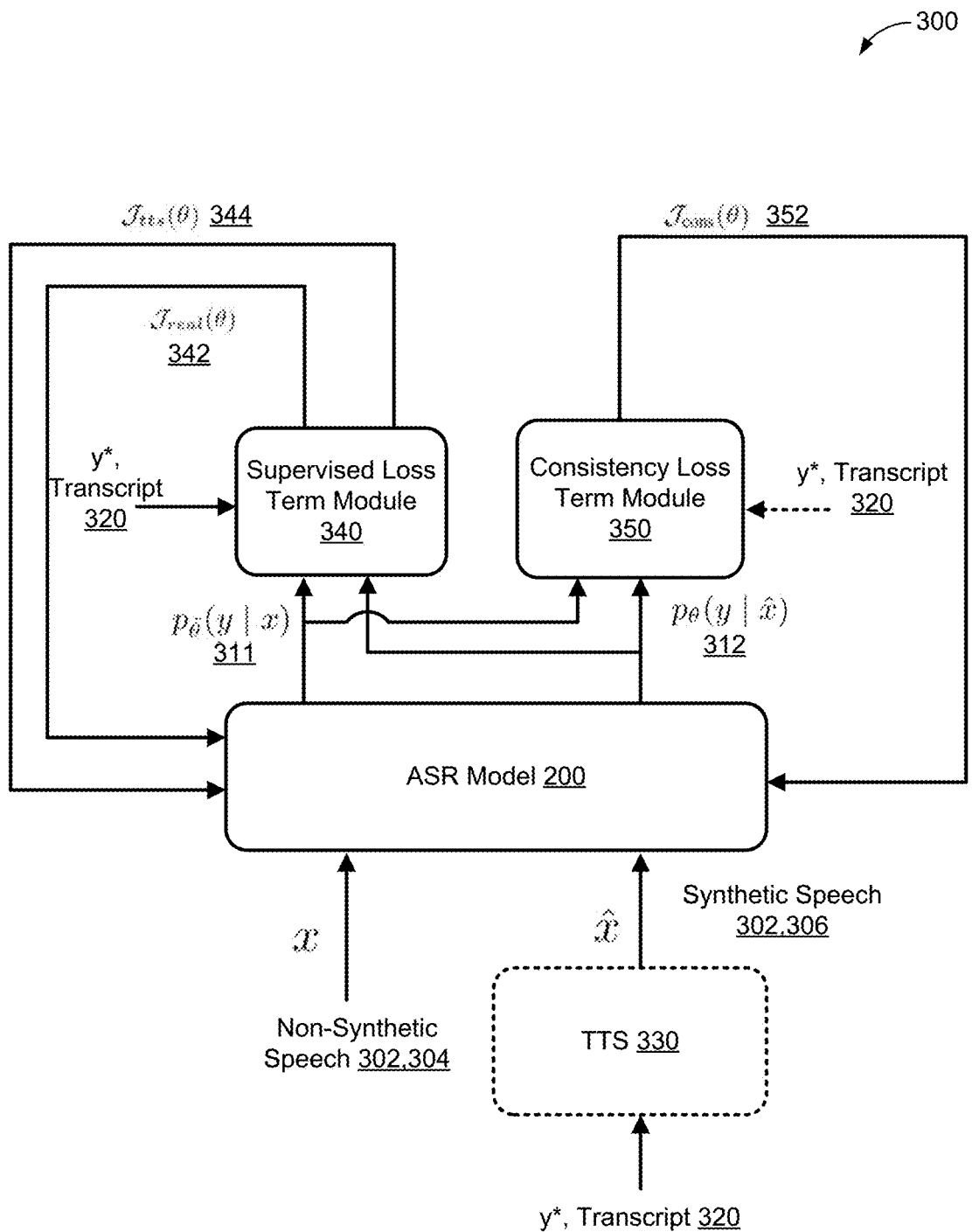
FIG. 3 is a schematic view of an example training process for promoting a speech recognition model of to learn consistent predictions on both non-synthetic speech and synthetic speech.

In some examples, the encoder network 210 of the RNN-T model 200a is made up of eight 2,048-dimensional LSTM layers, each followed by a 640-dimensional projection layer. The prediction network 220 may have two 2,048-dimensional LSTM layers, each of which is also followed by 640-dimensional projection layer. Finally, the joint network 230 may also have 640 hidden units. The softmax layer 240 may be composed of a unified word piece or grapheme set that is generated using all unique word pieces or graphemes in a plurality of training data sets 301 (FIG. 3).

Referring to FIG. 2B, an example AED model 200b associated with a Listen, Attend and Spell (LAS) model architecture that provides a single neural network including a listener encoder module 211 which is analogous to a conventional acoustic model, an attender module 221 that acts as an alignment model, and a decoder 231 that is analogous to the language model in a conventional system. Specifically, the listener encoder module 211 takes the input features (e.g., acoustic frames 110 (FIG. 1)), x, and maps them to a higher-level feature representation, $h^{enc}$. This process of generating an encoded feature representation, $h^{enc}$, can be done for each of the multiple input frames, representing different input time steps. These timesteps are denoted with a subscript u below. Thus, for a set of frames $\{f_1, f_2, f_3, \ldots f_u\}$ there can be a corresponding set of encoded outputs $\{h_1, h_2, h_3, \ldots h_u\}$.

The output of the listener encoder module 211 is passed to the attender module 221, which determines which encoder features in $h^{enc}$ should be attended to in order to predict the next output symbol, $y_i$, similar to a dynamic time warping (DTW) alignment module. In some examples, the attender module 221 is referred to herein as attender neural network or attender 221. The attender 221 can generate a context output $c_i$ for each of multiple output steps i. For each context output vector $c_i$, the attender 221 can compute attention based on the encodings for one or more input steps u, e.g., the encoding for the current input step as well as encodings for previous input steps. For example, the attender 221 can generate an attention context output $c_i$ over the set of all the encoder outputs of the utterance, e.g., the entire set $\{h_1, h_2, h_3, \ldots h_u\}$. The attention context vector can be a vector representing a weighted summary of the current and previous encodings for frames (e.g., portions) of the utterance being recognized.

Finally, the output of the attender 221 is passed to the decoder 231, which takes the attention context (e.g., a context vector or attention distribution), $c_i$, output by the attender 221, as well as an embedding of the previous prediction, $y_{i-1}$, in order to produce a decoder output. The decoder output can be a probability distribution, $P(y_i | y_{i-1}, \ldots, y_0, x)$, over the current sub-word unit, $y_i$, given the previous units, $\{y_{i-1}, \ldots, y_0\}$, and input, x. Accordingly, the decoder 231 generates, at each output step, a probability distribution over possible speech recognition hypotheses. As with the RNN-T model 200a discussed above with reference to FIG. 2A, the "possible speech recognition hypotheses" correspond to a set of output symbols each representing a symbol/character in a specified natural language.

Although not illustrated, the ASR model 200 may include a softmax layer that receives output of the decoder 231. In some implementations, the softmax layer is separate from the decoder 231 and processes the output, $y_i$, from the decoder 231, and the output of the softmax layer is then used in a beam search process to select orthographic elements. In some implementations, the softmax layer is integrated with the decoder 231, so that the output $y_i$ of the decoder 231 represents the output of the softmax layer.

The decoder 231 and/or an associated softmax layer may be trained to output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels are not so limited. For example, the set of output labels can include wordpieces and/or entire words, in addition to or instead of graphemes. The output distribution of the decoder 231 and/or the softmax layer can include a posterior probability value for each of the different output labels. Thus, if there are 100 different output labels representing different graphemes or other symbols, the output $y_i$ of the decoder or the output of a softmax layer that receives and processes the output $y_i$ can include 100 different probability values, one for each output label. The probability distribution can then be used to select and assign scores to candidate orthographic elements (e.g., graphemes, wordpieces, and/or words) in a beam search process for determining the transcription.

Referring to FIG. 3, an example training process 300 for promoting the ASR model 200 to learn consistent predictions on both non-synthetic speech (e.g., real/human speech) and synthetic speech (e.g., synthesized speech) includes generating a consistent loss term ($\mathcal{J}_{cons}(\theta)$) 352 between training utterance pairs 302 (also referred to as "training audio pairs") of non-synthetic and synthetic speech representations 304, 306 of a same training utterance. In short, the consistent loss term between the non-synthetic and synthetic speech representations of the same training utterance provides an unsupervised training aspect by encouraging the ASR model 200 to behave consistently regardless of whether the training utterance belongs to non-synthetic speech or synthetic speech and independent of supervised loss terms between a ground-truth transcription 308 and each of: non-synthetic speech recognition hypotheses output by the ASR model 200; and synthetic speech recognition hypothesis output by the ASR model 200.

The training process 300 may execute on the remote computing device 201 of FIG. 1. For instance, the remote computing device 201 includes data processing hardware 710 (FIG. 7) and memory hardware 720 (FIG. 7) in communication with the data processing hardware and storing instructions that when executed on the data processing hardware 710 cause the data processing hardware 710 to perform operations of the training process 300. In the example shown, training process 300 receives a set of training utterance pairs 302 and each training utterance pair 302 includes a non-synthetic speech representation 304 (e.g., human/real speech) of a corresponding utterance and a synthetic speech representation 306 of the same corresponding utterance. Each training utterance pair 302 is also associated with a same ground-truth transcription 320 of the corresponding utterance. In some implementations, the non-synthetic speech representation 304 may be initially paired with the ground-truth transcription 320. For instance, each non-synthetic speech representation 304 may be hand-transcribed by a human listener. In these implementations, a text-to-speech (TTS) module 330 may convert the ground-truth transcription 320 of the corresponding utterance into the synthetic speech representation 306 to provide the corresponding training utterance pair 302. Here, the non-synthetic speech representation 304 is associated with synthesized speech generated by the TTS module 330 by converting text associated with the ground-truth transcription 320 into synthesized audio. The TTS module 330 may apply a speaker embedding, z, when converting the ground-truth transcription (y*) 320 to obtain synthesized speech with a specific speaking style and prosody associated with the speaker embedding. Here, the ground-truth transcription (y*) 320 is associated with a source for supervised data augmentation in which the TTS module 330 generates a new synthetic speech representation ($\hat{x}$) 306 that has an expectation of being consistent with the non-synthetic speech representation (x) 304 associated with the ground-truth transcription (y*) 320.

In some examples, the training process 300 applies data augmentation to at least one of the non-synthetic speech representation 304 or the synthetic speech utterance representation 306 of at least one of the training utterance pairs 302. The data augmentation may include, without limitation, adding noise, manipulating timing (e.g., stretching), or adding reverberation to the corresponding speech representation.

The ASR model 200 receives, as input, the non-synthetic speech representation (x) 304 for the corresponding utterance as a sequence of features/vectors (e.g., acoustic frames 110 of FIG. 1) and generates, as output, for each of a plurality output steps, a first probability distribution 311 over possible non-synthetic speech recognition hypotheses (y) for the corresponding non-synthetic speech representation (x) 304 of the corresponding utterance. For simplicity, the term "non-synthetic speech recognition result 311" may be used to refer to the first probability distribution 311 over possible non-synthetic speech recognition hypotheses (y) for the corresponding non-synthetic speech representation (x) 304. The ASR model 200 also receives, as input, the synthetic speech representation ($\hat{x}$) 306 for the corresponding utterance as a sequence of features/vectors (e.g., acoustic frames 110 of FIG. 1) and generates, as output, for each of the plurality of output steps, a second probability distribution 312 over possible synthetic speech recognition hypotheses (y) for the corresponding synthetic speech representation ($\hat{x}$) 306 of the corresponding utterance. For simplicity, the term "synthetic speech recognition result 312" may be used to interchangeably refer to the second probability distribution 312 over possible synthetic speech recognition hypotheses (y) for the corresponding synthetic speech representation ($\hat{x}$) 306.

As with training a conventional end-to-end sequence-to-sequence ASR model, the training process 300 generates, for output by the ASR model 200 at each of the plurality of output steps, a first supervised loss term that includes a non-synthetic speech loss term ($\mathcal{J}_{real}(\theta)$) 342 based on the ground-truth transcription 320 and the non-synthetic speech recognition result 311 (y) for the corresponding non-synthetic speech representation (x) 304 of the corresponding utterance. In the example shown, the training process 300 executes a supervised loss term module 340 configured to receive the ground-truth transcription 320 and the first probability distribution 311 and output the non-synthetic speech loss term ($\mathcal{J}_{real}(\theta)$) 342. The first supervised loss term including the non-synthetic speech loss term ($\mathcal{J}_{real}(\theta)$) 342 may be calculated by the following equation.

$$\mathcal{J}_{real}(\theta) = \mathbb{E}_{x,y^* \in L}[p_\theta(y^*|x)] \quad (1)$$

Moreover, the training process 300 generates, at each of the plurality of output steps, a second supervised loss term for that includes a synthetic speech loss term ($\mathcal{J}_{tts}(\theta)$) 344 based on the ground-truth transcription 320 and the second probability distribution 312 over possible synthetic speech recognition hypotheses (y) for the corresponding synthetic speech representation ($\hat{x}$) 306 of the corresponding utterance. In the example shown, the training process 300 executes the supervised loss term module 340 configured to receive the ground-truth transcription 320 and the second probability distribution 312 and output the synthetic speech loss term ($\mathcal{J}_{tts}(\theta)$) 344. The second supervised loss term including the synthetic speech loss term ($\mathcal{J}_{tts}(\theta)$) 344 may be calculated by the following equation.

$$\mathcal{J}_{tts}(\theta) = \mathbb{E}_{x,y^* \in L}[p_\theta(y^*|\hat{x} \sim q(\hat{x}|y^*,z))] \quad (2)$$

Where y*, z denotes the synthetic speech representation ($\hat{x}$) 306 generated by the TTS module 330 based on the ground-truth transcription (y*) and a speaker embedding (z).

The supervised loss term module 340 may provide the non-synthetic speech loss term ($\mathcal{J}_{real}(\theta)$) 342 and the synthetic speech loss term ($\mathcal{J}_{tts}(\theta)$) 344 back to the ASR model 200. For instance, the training process 300 may train the ASR model 200 using a stochastic optimization algorithm, such as stochastic gradient decent, to train the ASR model 200 through backpropagation. Here, the stochastic optimization algorithm uses the loss terms 342, 344 to define respective loss functions (e.g., cross-entropy loss functions) based on a difference between actual outputs (e.g., non-synthetic speech recognition and synthetic speech recognition results 311, 312) of the neural network and desired outputs (e.g., the ground-truth transcription 320 of the corresponding utterance). For instance, the loss function is computed for a batch of training examples, and then differentiated with respect to each weight in the ASR model 200. In batch training, the non-synthetic speech loss term ($\mathcal{J}_{real}(\theta)$) 342 may correspond to an average loss obtained for a respective batch of non-synthetic speech representations 304 and the synthetic speech loss term ($\mathcal{J}_{tts}(\theta)$) 344 may correspond to an average loss obtained for a respective batch of synthetic speech representations 306. Further, the ASR model 200 may be trained on corresponding batches of non-synthetic and synthetic speech representations 304, 306 in parallel such that the supervised loss term module 340 outputs corresponding non-synthetic and synthetic speech loss terms 342, 344 in parallel.

In the example shown, the training process 300 further determines, at each of the plurality of output steps for each training utterance pair 302, a consistent loss term ($\mathcal{J}_{cons}(\theta)$) 352 for the corresponding training utterance pair 302 based on the first probability distribution 311 over possible non-synthetic speech recognition hypotheses and the second probability distribution 312 over possible non-synthetic speech recognition hypotheses. For instance, the training process 300 may employ a consistency loss term module 350 configured to receive, at each output step, the corresponding non-synthetic speech and synthetic speech recognition results 311, 312 output by the ASR model 200, and determine the consistency loss term 352 for the corresponding training utterance pair 302 at the output step.

In some examples, the training process 300 determines the consistent loss term 352 based on a Kullback-Leibler divergence ($D_{KL}$) between the first probability distribution 311 over possible non-synthetic speech recognition hypotheses and the second probability distribution 312 over possible non-synthetic speech recognition hypotheses. The consistent loss term 352 based on $D_{KL}$ may be expressed by the following equation.

$$\mathcal{J}(\theta) = \mathbb{E}_{x \in U} \mathbb{E}_{\hat{x} \sim q(\hat{x}|x)} \mathcal{D}_{KL}(p_\theta(y|x) \| p_\theta(y|\hat{x})) \quad (3)$$

Here, the consistent loss term 352 determined for the training utterance pair 302 at each output step provides an "unsupervised" loss term that is independent of the accuracy of the ASR model (e.g., independent of the supervised loss terms 342, 344), and thus, may be employed to update parameters of the ASR model 200 for promoting consistency between non-synthetic and synthetic speech representations of same utterances. In batch training, the consistent loss term 352 may correspond to an average loss term obtained for the batch. In other words, the consistent loss term 352 permits the ASR model 200 to learn to behave the same, e.g., make consistent predictions on both non-synthetic speech (e.g., real/human speech) and synthetic speech (e.g., synthesized speech) of a same training utterance, regardless of whether the training utterance belongs to non-synthetic speech or synthetic speech. In the example shown, the training process 300 is configured to output corresponding non-synthetic and synthetic speech loss terms 342, 344 from the supervised loss term module 340 and output the consistent loss term 352 from the consistency loss term module 350 in parallel.

Advantageously, the ASR model 200 can then be further trained on large data sets of synthetic speech without having to rely on non-synthetic speech training examples, or at least reduce the number of non-synthetic speech training examples relative to the number of synthetic speech representations, to produce accurate speech recognition results for human utterances during inference. Accordingly, the ASR model 200 is capable of rapidly moving to a new domain without having to rely on in-domain transcribed, non-synthetic speech since synthetic speech can be generated from unpaired text on the fly for training the ASR model 200 in the new domain. In one example use case, accuracy of the ASR model 200 can be drastically improved for recognizing speech in natural languages where transcribed non-synthetic speech is difficult to obtain by increasing the number of speech training examples from synthetic speech generated from unpaired text.

Figure 4:
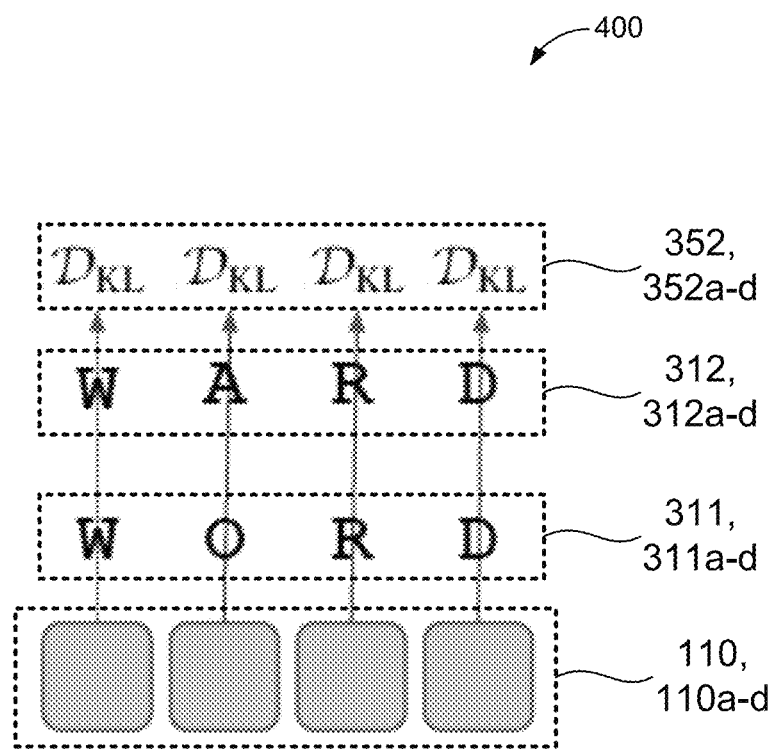
FIG. 4 is a schematic view of speech recognition results output by a speech recognition model using the AED model architecture of FIG. 2B for both non-synthetic and synthetic speech representations of a same corresponding utterance.

FIG. 4 shows a schematic view 400 of a consistent loss term 352 based on a $D_{KL}$ between non-synthetic and synthetic speech recognition results 311, 312 generated by an attention-based encoder-decoder (AED) model 200b (FIG. 2B). In the example shown, a sequence of non-synthetic speech recognition results 311 is associated with a non-synthetic speech representation 304 of a training utterance of the English word "WORD" and a sequence of synthetic speech recognition results 312 is associated with a synthetic speech representation 306 of the same training utterance of the English word "WORD". The AED model 200b generates, at each of a plurality of output steps, a corresponding non-synthetic speech recognition result 311, 311a-d for the non-synthetic speech representation 304 of the training utterance. While in practice the non-synthetic speech recognition result 311a-d at each output step represents a probability distribution over possible non-synthetic speech recognition hypotheses, for simplicity, the example shown only shows the non-synthetic speech recognition result 311 depicting the non-synthetic speech recognition hypothesis that is associated with a highest probability among the probability distribution over possible non-synthetic speech recognition hypotheses. For example, a first non-synthetic speech recognition result 311a at the first output step includes an output label for the character "W", a second non-synthetic speech recognition result 311b at the second output step includes an output label for the character "O", a third non-synthetic speech recognition result 311c at the third output step includes an output label for the character "R", and a fourth non-synthetic speech recognition result 311d at the fourth output step includes an output label for the character "D". While not shown, a respective non-synthetic speech loss term ($\mathcal{J}_{real}(\theta)$) 342 may be determined at each output step based on the non-synthetic speech recognition result 311 and a ground-truth label y* for the output step obtained from the ground-truth transcript 320.

The AED model 200b similarly generates, at each of the plurality of output steps, a corresponding synthetic speech recognition result 312, 312a-d for the synthetic speech representation 306 of the training utterance 302. For simplicity, the example only shows the synthetic recognition result 312a-d at each output step depicting the synthetic speech recognition hypotheses that is associated with a highest probability among a probability distribution over possible synthetic speech recognition hypotheses. For example, a first synthetic speech recognition result 312a at the first output step includes an output label for the character "W", a second synthetic speech recognition result 312b at the second output step includes an output label for the character "A", a third synthetic speech recognition result 312c at the third output step includes an output label for the character "R", and a fourth synthetic speech recognition result 312d at the fourth output step includes an output label for the character "D". While not shown, a respective synthetic speech loss term ($\mathcal{J}_{tts}(\theta)$) 344 may be determined at each output step based on the synthetic speech recognition result 312 and a ground-truth label y* for the output step obtained from the ground-truth transcript 320. For instance, the respective synthetic speech loss term ($\mathcal{J}_{tts}(\theta)$) 344 at the second output step may be higher than the respective non-synthetic loss term 342 due to the model incorrectly predicting the character "A" instead of "O" for the synthetic speech representation. While the example depicts the output labels for the speech recognition results 311, 312 including graphemes, the training process 300 may similarly predict output labels for wordpieces or phonemes.

The AED model 200b conveniently aligns output sequence of non-synthetic speech recognition results 311a-d with the output sequence of synthetic speech recognition results 312a-d. Therefore, the consistent loss term 352 can be determined at each output step using Equation (3) based on the Di between the non-synthetic and synthetic speech recognition results 311, 312 generated at each output step. Notably, the consistent loss term 352 determined at each output step is independent of actual supervised loss terms 342, 344. As an illustrative example, while both the non-synthetic speech recognition result 311a and the synthetic speech recognition result 312a at the first output step are both correct, e.g., "W", the probability/score associated with the non-synthetic speech recognition result 311a may different than the probability/score associated with the synthetic speech recognition result 312a.

Figure 5:
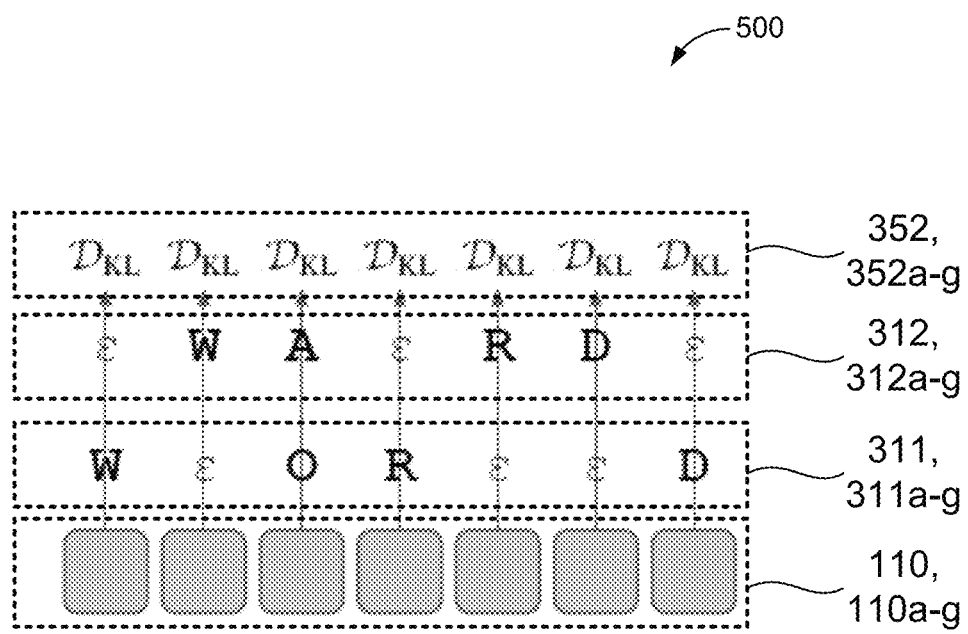
FIG. 5 is a schematic view of speech recognition results output by a speech recognition model using RNN-T model architecture of FIG. 2A for both non-synthetic and synthetic speech representations of a same corresponding utterance.

FIG. 5 shows a schematic view 500 of a consistent loss term 352 based on a Diel, between non-synthetic and synthetic speech recognition results 311, 312 generated by a frame alignment-based transducer model 200a (e.g., RNN-T (FIG. 2A)). In the example shown, the non-synthetic speech recognition result 311 is associated with a non-synthetic speech representation 304 of a training utterance of the English word "WORD" and the synthetic speech recognition result 312 is associated with a synthetic speech representation 306 of the same training utterance of the English word "WORD". By contrast to the AED model 200a, the streaming nature of the RNN-T model 200a results in a misalignment between the non-synthetic and synthetic speech recognition results 311, 312 at each output step. Here, the non-synthetic speech recognition result 311a-g at each output step is aligned with a corresponding input frame 110 of the non-synthetic speech representation 304a-g and the synthetic speech recognition result 312a-g at each output step is aligned with a corresponding input frame 110 of the synthetic speech representation 306a-g. This misalignment is due to the blank symbols c that the RNN-T model emits at output steps in the time-domain to enable speech recognition in the streaming fashion, e.g., alleviating the need to wait for all of the audio before beginning the computation. As a result of the misalignment between the non-synthetic and synthetic speech recognition results 311, 312 output by the RNN-T model 200a at each of the time steps, the consistency loss term 352 cannot simply be determined at each output step using Equation (3) based on the Dom, between the non-synthetic and synthetic speech recognition results 311, 312 generated at each output step. For instance, in the example shown, the RNN-T model 200a emits non-blank output labels for the characters "W", "O", "R", and "D" at the first, third, fourth, and seventh non-synthetic speech recognition results 311a, 311c, 311d, 311g, respectively, while the emitting non-blank output labels for the characters "W", "A", "R", and "D" at the second, third, fifth, and sixth non-synthetic speech recognition results 312b, 312c, 312e, 312f, respectively. While the example depicts the output labels for the speech recognition results 311, 312 including graphemes, the training process 300 may similarly predict output labels for wordpieces or phonemes.

For calculating the consistency loss term 352 associated with the RNN-T model 200a, implementations first include defining a distribution $\phi(u)^{RNNT}$ based on a probability of valid alignments of the ground-truth transcription y* as follows.

$$\phi(u)^{RNNT} = f_\theta(y_u|x)_{y_u \in y^*} \tag{4}$$

Where the distribution $\phi(u)^{RNNT}$ is defined over each output label in the ground-truth transcription y*, but not the entire label set L as with the AED model 200b above.

Applying the standard definition of forward and backward probabilities, a posterior of the output labels in the ground-truth transcription y* can be defined as a sum of the probabilities of all possible alignments as follows.

$$p_\theta(y^*|x) = \sum_{t=1}^{T} \alpha(t,u)q(t,u)\beta(t,u+1) \tag{5}$$

Where $\alpha(t,u)$ represents the forward probability of outputting $y_{1:u}$ during frame 1 to t in the alignment lattice and $\beta(t,u)$ represents the backward probability of outputting $y_{u+1:U}$ during frame t to T where U is the number of output labels in the utterance and T is the number of input frames in the utterance. Accordingly, each RNN-T prediction q(t,u) at frame t and output u, is given by the feature sequence up to frame t and transcription sequence up to the output u as follows.

$$q(t,u) = p_\theta(y_u|x_{1:t}, y_{1:u-1}^*) \tag{6}$$

In some examples, the following equation is applied to optimize the posterior of the ground-truth outputs.

$$\mathcal{L} = -\log p_\theta(y^*|x) \tag{7}$$

Where the gradient of the token posterior is provided as follows.

$$\phi(u)^{RNNT} = \sum_{t=1}^{T} \frac{\partial \mathcal{L}}{\partial q(t,u)_{y_u \in y^*}} \tag{8}$$

Lastly, each output can be marginalized over all input frames using the following equation.

$$\frac{\partial \mathcal{L}}{\partial q(t,u)_{y_u \in y^*}} = \frac{\alpha(t,u)q(t,u)\beta(t,u+1)}{p_\theta(y^*|x)} \tag{9}$$

Accordingly, for each output label in the ground-truth transcription, $y_u \in y^*$, the marginalized distribution of Equation (9) can be used to take the posterior of the whole sequence of ground-truth labels into account for determining the consistent loss term 352 at each output step using Equation (3). In essence, for calculating consistent loss between two output sequences predicted by a frame alignment-based transducer model 200a (e.g., RNN-T (FIG. 2A)), Equations (4)-(9) are applied to determine a probability of having a sequence of output labels predicted/output by the RNN-T model 200a that align with a sequence of output labels representing the ground-truth transcription independent of the actual alignment of the predicted sequence of output labels with the input frames.

Figure 6:
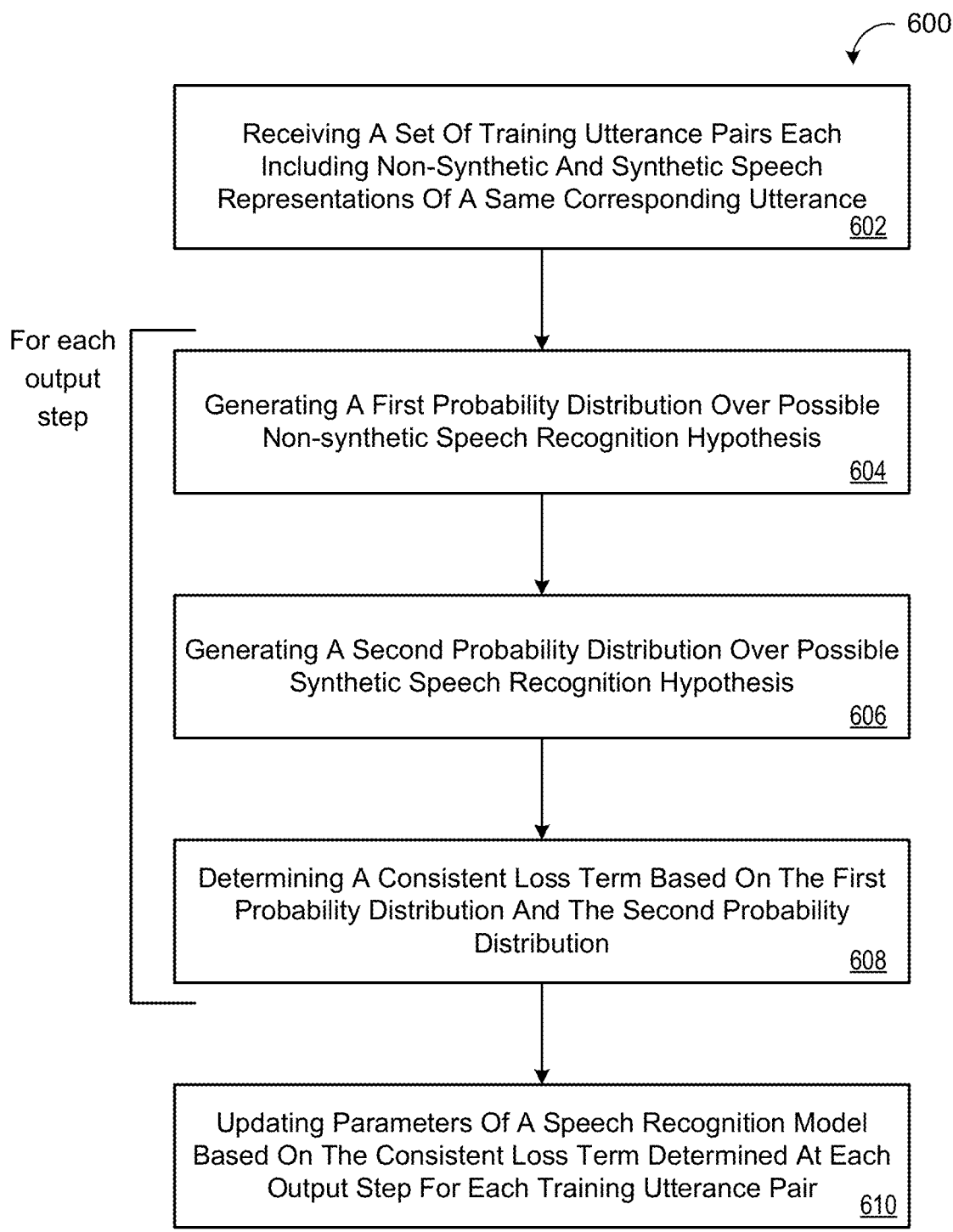
FIG. 6 is a flowchart of an example arrangement of operations for a method of training a speech recognition model.

FIG. 6 is a flowchart of an example arrangement of operations for a method 600 of training a speech recognition model. The ASR model 200 may include an attention-based encoder-decoder (AED) model 200b (FIG. 2B) or a frame alignment-based transducer model 200a (FIG. 2A). At operation 602, the method 600 includes receiving a set of training utterance pairs 302. Each training utterance pair 302 includes a non-synthetic speech representation 304 of a corresponding utterance and a synthetic speech representation 306 of the same corresponding utterance. At each of a plurality of output steps for each training utterance pair 302 in the set of training utterance pairs: the method 600 also includes generating, for output by the ASR model 200, a first probability distribution 311 over possible non-synthetic speech recognition hypotheses for the corresponding non-synthetic speech representation 304 of the corresponding utterance at operation 604; generating, for output by the ASR model 200, a second probability distribution 312 over possible synthetic speech recognition hypotheses for the corresponding synthetic speech representation 306 of the corresponding utterance at operation 606; and determining a consistent loss term 352 for the corresponding training utterance pair 302 based on the first probability distribution 311 over possible non-synthetic speech recognition hypotheses and the second probability distribution 312 over possible non-synthetic speech recognition hypotheses at operation 608. At operation 610, the method 600 also includes updating parameters of the ASR model 200 based on the consistent loss term 352 determined at each of the plurality of output steps for each training utterance pair in the set of training utterance pairs.

While the examples herein determine a consistent loss term 352 between non-synthetic speech and synthetic speech representations of a same utterance, the techniques herein may similarly be applied for determining a consistent loss term between other types of datasets, such as, without limitation, image recognition and machine translation. For instance, training image pairs that include a non-synthetic image (or pixel or a sequence of pixels for a non-synthetic image) representation of a corresponding object and a synthetic image (or a pixel in a sequence of pixels for a synthetic image) representation of the same corresponding object could be fed to either of the frame alignment-based transducer model 200a or the AED model 200b for training the model 200a, 200b to learn to recognize the corresponding object. In one example, the object could be an animal such as a dog, and a ground-truth label set could include labels designating the non-synthetic and synthetic image pairs as "dog". Negative training examples could also be provided where non-synthetic and synthetic image pairs do not represent a dog, and therefore include ground-truth labels of "no dog".

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 7:
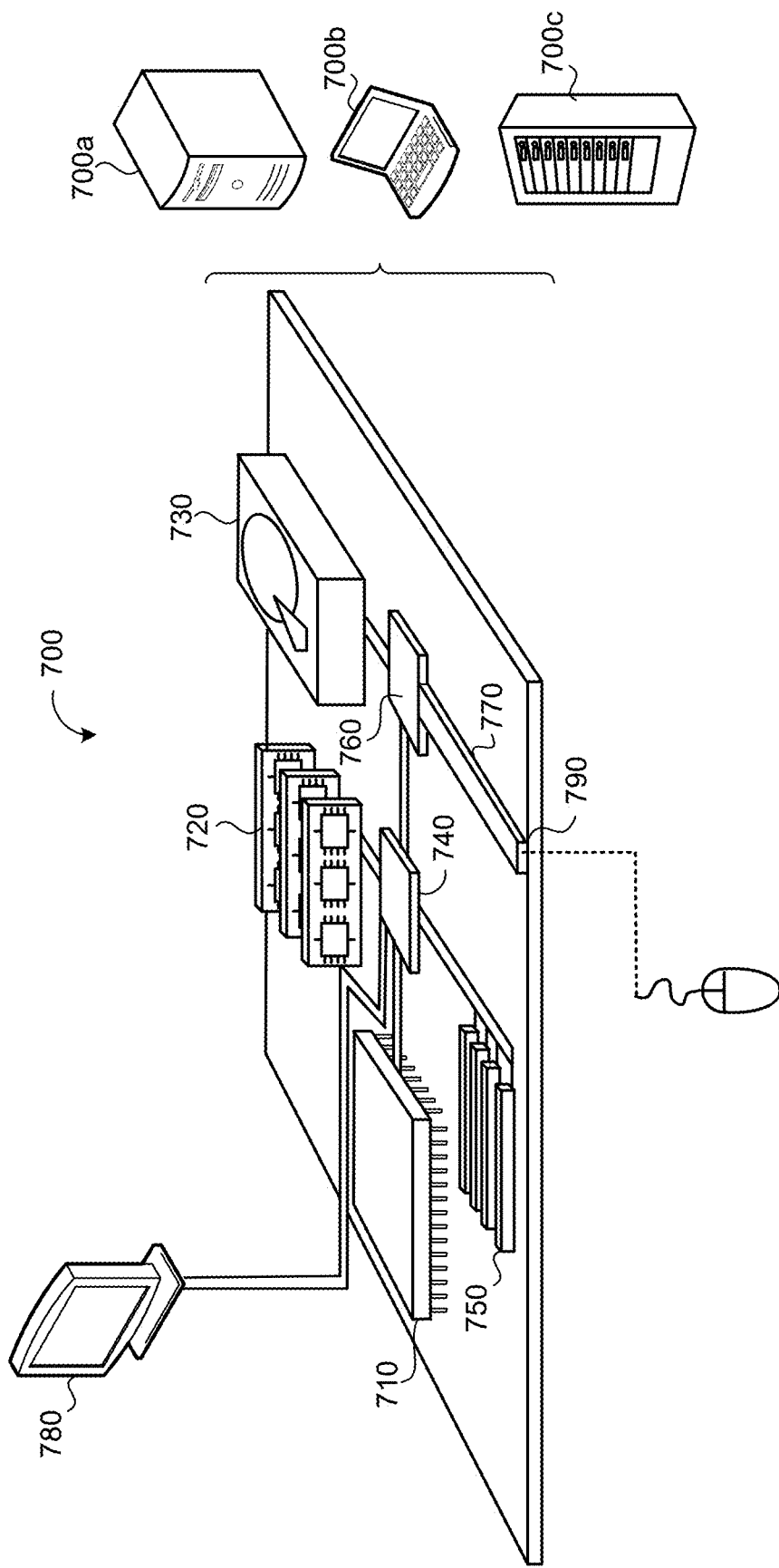
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving a set of training utterance pairs, each training utterance pair comprising:
   a respective non-synthetic speech representation of a corresponding utterance; and
   a respective synthetic speech representation of the same corresponding utterance as the respective non-synthetic speech representation, the synthetic speech representation generated from a respective ground-truth transcription of the corresponding utterance;
   at each of a plurality of output steps for each training utterance pair in the set of training utterance pairs:
   generating, for output by a speech recognition model, a first probability distribution over possible non-synthetic speech recognition hypotheses for the corresponding non-synthetic speech representation of the corresponding utterance;
   generating, for output by the speech recognition model, a second probability distribution over possible synthetic speech recognition hypotheses for the corresponding synthetic speech representation generated from the respective ground-truth transcription of the corresponding utterance; and
   determining a consistent loss term for the corresponding training utterance pair based on the first probability distribution over possible non-synthetic speech recognition hypotheses and the second probability distribution over possible synthetic speech recognition hypotheses; and updating parameters of the speech recognition model based on the consistent loss term determined at each of the plurality of output steps for each training utterance pair in the set of training utterance pairs.

2. The method of claim 1, wherein the operations further comprise, at each of the plurality of output steps for each training utterance pair in the set of training utterance pairs:

generating a non-synthetic speech loss term based on the first probability distribution over possible non-synthetic speech recognition hypotheses for the respective non-synthetic speech representation of the corresponding utterance and the respective ground-truth transcription of the corresponding utterance; and generating a synthetic speech loss term based on the second probability distribution over possible synthetic speech recognition hypotheses for the respective synthetic speech representation generated from the respective ground-truth transcription of the corresponding utterance and the respective ground-truth transcription of the corresponding utterance.

3. The method of claim 2, wherein the parameters of the speech recognition model are updated based on the consistent loss term determined at each of the plurality of output steps for each training utterance pair in the set of training utterance pairs independently of the non-synthetic and synthetic speech loss terms generated at each of the plurality of output steps for each training utterance pair in the set of training utterance pairs.

4. The method of claim 1, wherein the respective synthetic speech representation in each training utterance pair comprises synthesized speech representing the respective ground-truth transcription of the corresponding utterance.

5. The method of claim 1, wherein the operations further comprise, for each training utterance pair, converting, using a text-to-speech (TTS) model, the respective ground-truth transcription of the corresponding utterance to generate the respective synthetic speech representation.

6. The method of claim 1, wherein the operations further comprise, for at least one training utterance pair, applying data augmentation to at least one of the respective non-synthetic speech representation or the respective synthetic speech representation.

7. The method of claim 6, wherein the applied data augmentation comprises at least one of adding noise, adding reverberation, or manipulating timing.

8. The method of claim 1, wherein determining the consistent loss term for the corresponding training utterance pair is based on a Kullback-Leibler divergence between the first probability distribution over possible non-synthetic speech recognition hypotheses and the second probability distribution over possible synthetic speech recognition hypotheses.

9. The method of claim 8, wherein the operations further comprise, prior to determining the consistent loss term for the corresponding training utterance pair, when the speech recognition model comprises a frame alignment-based transducer model, defining a valid alignment distribution for a sequence of first probability distributions over possible non-synthetic speech recognition hypotheses generated at each of the output steps and a sequence of second probability distributions over possible synthetic speech recognition hypotheses generated at each of the output steps based on a probability of valid alignments of the respective ground-truth transcription of the corresponding utterance.

10. The method of claim 9, wherein the valid alignment distribution is defined over each output label in a sequence of output labels representing the respective ground-truth transcription of the corresponding utterance.

11. The method of claim 1, wherein the speech recognition model comprises a frame-alignment-based transducer model.

12. The method of claim 11, wherein the frame-alignment-based transducer model comprises a Recurrent Neural Network-Transducer (RNN-T) model.

13. The method of claim 1, wherein the speech recognition model comprises an alignment-based encoder-decoder model.

14. A system comprising:
data processing hardware; and
memory hardware in communication with the data processing hardware, the memory hardware storing instructions that when executed on the data processing hardware cause the data processing hardware to perform operations comprising:
receiving a set of training utterance pairs, each training utterance pair comprising:
a respective non-synthetic speech representation of a corresponding utterance; and
a respective synthetic speech representation of the same corresponding utterance as the respective non-synthetic speech representation, the synthetic speech representation generated from a respective ground-truth transcription of the corresponding utterance;
at each of a plurality of output steps for each training utterance pair in the set of training utterance pairs:
generating, for output by a speech recognition model, a first probability distribution over possible non-synthetic speech recognition hypotheses for the corresponding non-synthetic speech representation of the corresponding utterance;
generating, for output by the speech recognition model, a second probability distribution over possible synthetic speech recognition hypotheses for the corresponding synthetic speech representation generated from the respective ground-truth transcription of the corresponding utterance; and
determining a consistent loss term for the corresponding training utterance pair based on the first probability distribution over possible non-synthetic speech recognition hypotheses and the second probability distribution over possible synthetic speech recognition hypotheses; and
updating parameters of the speech recognition model based on the consistent loss term determined at each of the plurality of output steps for each training utterance pair in the set of training utterance pairs.

15. The system of claim 14, wherein the operations further comprise, at each of the plurality of output steps for each training utterance pair in the set of training utterance pairs:

generating a non-synthetic speech loss term based on the first probability distribution over possible non-synthetic speech recognition hypotheses for the respective non-synthetic speech representation of the corresponding utterance and the respective ground-truth transcription of the corresponding utterance; and generating a synthetic speech loss term based on the second probability distribution over possible synthetic speech recognition hypotheses for the respective synthetic speech representation generated from the respective ground-truth transcription of the corresponding utterance and the respective ground-truth transcription of the corresponding utterance.

16. The system of claim 15, wherein the parameters of the speech recognition model are updated based on the consistent loss term determined at each of the plurality of output steps for each training utterance pair in the set of training utterance pairs independently of the non-synthetic and synthetic speech loss terms generated at each of the plurality of output steps for each training utterance pair in the set of training utterance pairs.

17. The system of claim 14, wherein the respective synthetic speech representation in each training utterance pair comprises synthesized speech representing the respective ground-truth transcription of the corresponding utterance.

18. The system of claim 14, wherein the operations further comprise, for each training utterance pair, converting, using a text-to-speech (TTS) model, the respective ground-truth transcription of the corresponding utterance to generate the respective synthetic speech representation.

19. The system of claim 14, wherein the operations further comprise, for at least one training utterance pair, applying data augmentation to at least one of the respective non-synthetic speech representation or the respective synthetic speech representation.

20. The system of claim 19, wherein the applied data augmentation comprises at least one of adding noise, adding reverberation, or manipulating timing.

21. The system of claim 14, wherein determining the consistent loss term for the corresponding training utterance pair is based on a Kullback-Leibler divergence between the first probability distribution over possible non-synthetic speech recognition hypotheses and the second probability distribution over possible synthetic speech recognition hypotheses.

22. The system of claim 21, wherein the operations further comprise,
prior to determining the consistent loss term for the corresponding training utterance pair, when the speech recognition model comprises a frame alignment-based transducer model, defining a valid alignment distribution for a sequence of first probability distributions over possible non-synthetic speech recognition hypotheses generated at each of the output steps and a sequence of second probability distributions over possible synthetic speech recognition hypotheses generated at each of the output steps based on a probability of valid alignments of the respective ground-truth transcription of the corresponding utterance.

23. The system of claim 22, wherein the valid alignment distribution is defined over each output label in a sequence of output labels representing the respective ground-truth transcription of the corresponding utterance.

24. The system of claim 14, wherein the speech recognition model comprises a frame-alignment-based transducer model.

25. The system of claim 24, wherein the frame-alignment-based transducer model comprises a Recurrent Neural Network-Transducer (RNN-T) model.

26. The system of claim 14, wherein the speech recognition model comprises an alignment-based encoder-decoder model.

* * * * *